(12) United States Patent
Lin

(10) Patent No.: US 9,040,126 B2
(45) Date of Patent: *May 26, 2015

(54) FABRICATION OF ZEOLITE COMPOSITE FILM

(71) Applicant: I-SHOU UNIVERSITY, Kaohsiung (TW)

(72) Inventor: Chiung-Fang Lin, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 32 days.

This patent is subject to a terminal disclaimer.

(21) Appl. No.: 13/970,619

(22) Filed: Aug. 20, 2013

(65) Prior Publication Data

US 2014/0170336 A1    Jun. 19, 2014

(30) Foreign Application Priority Data

Dec. 14, 2012 (TW) .............................. 101147619 A

(51) Int. Cl.
*H05H 1/24* (2006.01)
*C01B 39/20* (2006.01)
*C01B 37/02* (2006.01)

(52) U.S. Cl.
CPC ............... *C01B 39/205* (2013.01); *C01B 37/02* (2013.01)

(58) Field of Classification Search
CPC .......... B32B 3/00; C23C 4/127; C23C 4/121; C23C 26/00; B82Y 40/00; C01B 39/205; C01B 37/02
USPC .................................................. 427/576, 569
See application file for complete search history.

(56) References Cited

U.S. PATENT DOCUMENTS

| 2002/0134995 A1 * | 9/2002 | Yan et al. ....................... 257/200 |
| 2009/0082201 A1 | 3/2009 | Negishi et al. |
| 2012/0171418 A1 | 7/2012 | Lin et al. |

FOREIGN PATENT DOCUMENTS

| TW | 201018645 | 5/2010 |
| TW | 201226319 | 7/2012 |

OTHER PUBLICATIONS

The Preparation and Their Properties of Faujsite Zeolite Film Deposited under Plasma Jet System, a thesis by Tzu-han Kuan, 2007.*
Partial translation of "The Preparation and Their Properties of Faujsite Zeolite Film Deposited under Plasma Jet System", a thesis by Tzu-han Kuan, 2007.*
Parvulescu et al. Studies in Surface Science and Catalysis, vol. 154, pp. 2603-2609.*
RSC Paredes et al. Surface and Coatings Technology 200 (2006) pp. 3049-3055.*
Ikari et al., "Structural Control of Mesoporous Silica Nanoparticles in a Binary Surfactant System", Langmuir, vol. 22, No. 2, 2006, pp. 802-806.
"Office Action of Taiwan Counterpart Application" issued on Jul. 7, 2014, p. 1-p. 6.

* cited by examiner

*Primary Examiner* — Kelly M Gambetta
(74) *Attorney, Agent, or Firm* — Jianq Chyun IP Office

(57) ABSTRACT

A fabrication of a zeolite composite film includes mixing a composition of water, aluminum isopropoxide, TMAOH, and TEOS according to a set ratio, followed by stirring and heating to obtain a mixture; performing a centrifugation on the mixture to obtain an upper layer suspension; preparing a mesoporous particle suspension that includes a plurality of mesoporous particles, and each mesoporous particle includes a plurality of templating agents; vaporizing a mixture suspension formed from both the upper layer suspension and the mesoporous particle suspension to form a plurality of vaporized droplets; depositing the vaporized droplets on a heated substrate while removing the templating agents to form the zeolite composite film with a plurality of macroporous, mesoporous and microporous structures.

**14

```
┌─────────────────────────────────────────────────────────┐
│ A composition of water, aluminum isopropoxide, TMAH, and│
│ TEOS is mixed according to a set ratio to form a first  │
│ mixture, and the first mixture is hydrolyzed by stirring in ├─ S102
│ room temperature. Then, the first mixture is heated to  │
│ obtain a second mixture.                                │
└─────────────────────────────────────────────────────────┘
                            ↓
┌─────────────────────────────────────────────────────────┐
│ The upper layer suspension obtained from the centrifugation│
│ of the second mixture is taken, wherein the upper layer │
│ suspension includes a plurality of zeolite crystals and a ├─ S104
│ plurality of silicon colloids, and the particle sizes of the│
│ zeolite crystals are less than 50 nm.                   │
└─────────────────────────────────────────────────────────┘
                            ↓
┌─────────────────────────────────────────────────────────┐
│ A mesoporous particle suspension is fabricated, wherein the│
│ mesoporous particle suspension includes a plurality of  │
│ mesoporous particles, and each mesoporous particle      ├─ S106
│ includes a plurality of pores and a plurality of templating│
│ agents inside the pores.                                │
└─────────────────────────────────────────────────────────┘
                            ↓
┌─────────────────────────────────────────────────────────┐
│      A heat treatment is applied to the substrate.      ├─ S108
└─────────────────────────────────────────────────────────┘
                            ↓
┌─────────────────────────────────────────────────────────┐
│ The upper layer suspension and the mesoporous particle  │
│ suspension are mixed to form a mixture suspension, and  ├─ S110
│ the mixture suspension is vaporized to form a plurality of│
│ vaporized droplets.                                     │
└─────────────────────────────────────────────────────────┘
                            ↓
┌─────────────────────────────────────────────────────────┐
│ The vaporized droplets are deposited on a substrate to  │
│ remove the templating agents in the mesoporous particles│
│ and to form the zeolite composite film, wherein the zeolite ├─ S112
│ composite film includes a plurality of macroporous      │
│ structures, a plurality of mesoporous structures, and a │
│ plurality of microporous structures.                    │
└─────────────────────────────────────────────────────────┘
```

FIG. 1

FABRICATION OF ZEOLITE COMPOSITE FILM

CROSS-REFERENCE TO RELATED APPLICATION

This application claims the priority benefit of Taiwan application serial no. 101147619, filed on Dec. 14, 2012. The entirety of the above-mentioned patent application is hereby incorporated by reference herein and made a part of this specification.

BACKGROUND OF THE INVENTION

1. Field of the Invention

The invention relates to a fabrication of a zeolite thin film, and more particularly, to a fabrication of a zeolite composite film having a regular macroporous-mesoporous-microporous structure.

2. Description of Related Art

The main fabrications of a zeolite thin film are generally secondary growth and spin coating, wherein the template needs to be removed after the fabrication of the thin film. Currently, the most common and easiest fabrication is to use high-temperature calcination to remove the template. However, since the substrate has a different material and a different coefficient of thermal expansion, during calcination, the thin film often ruptures or separates from the substrate. Therefore, current techniques have developed many various fabrications such as solvent extraction, the microwave method, UV decomposition, and ozone oxidation to remove the template and to reduce occurrences of thin film rupture or the thin film separating from the substrate. However, the fabrications usually involve solvents or are very energy consuming, and therefore are not green processes.

To overcome the various problems of the fabrication of a zeolite thin film, the inventor of the present case has previously proposed an aerosol deposition system to fabricate a nanoscale pure silicon MCM-41 thin film (U.S. patent application Ser. No. 13/337,328), wherein during coating, the templating agents in the MCM-41 particles may be removed, eliminating the need for a high temperature calcination process over a long period of time to remove the templating agents. However, the roughness of an ordinary thin film composed of only crystalline particles, as well as the adhesion between the thin film and the substrate, are far worse than the adhesion and the roughness of a thin film composed of colloids such as macromolecules. Therefore, even though the zeolite film has good mechanical strength, hydrothermal stability, and high porosity, in order to enter the commercialization stage, the problems mentioned previously have to be effectively solved.

Based on the above, fabricating a zeolite thin film having higher adhesion and low roughness using a more green fabrication to is a key issue to which a solution is currently needed.

SUMMARY OF THE INVENTION

The invention provides a fabrication of a zeolite composite film that may fabricate a zeolite composite film having higher adhesion.

The invention provides a fabrication of a zeolite composite film including the following steps. A composition of water, aluminum isopropoxide, TMAOH, and TEOS is mixed according to a set ratio to form a first mixture, and the first mixture is hydrolyzed by stirring in room temperature. Then, the first mixture is heated to obtain a second mixture. An upper layer suspension obtained from the centrifugation of the second mixture is taken, wherein the upper layer suspension includes a plurality of zeolite crystals and a plurality of silicon colloids, and the particle sizes of the zeolite crystals are less than 50 nm. A mesoporous particle suspension is fabricated, wherein the mesoporous particle suspension includes a plurality of mesoporous particles, and each mesoporous particle includes a plurality of pores and a plurality of templating agents inside the pores. A heat treatment is applied to a substrate. The upper layer suspension and the mesoporous particle suspension are mixed to form a mixture suspension, and the mixture suspension is vaporized to form a plurality of vaporized droplets. The vaporized droplets are deposited on the substrate to remove the templating agents in the mesoporous particles and to form a zeolite composite film, wherein the zeolite composite film includes a plurality of macroporous, mesoporous and microporous structures.

In an embodiment of the invention, the set ratio of the first mixture is expressed by the mole ratio $0.15\,Na_2O:5.5\,(TMA)_2O:2.3\,Al_2O_3:10\,SiO_2:570\,H_2O$.

In an embodiment of the invention, the temperature of the heat treatment applied to the substrate is between 250° C. and 400° C.

In an embodiment of the invention, before the heat treatment is applied to the substrate, a pretreatment is applied to the substrate.

In an embodiment of the invention, the step of vaporizing the mixture suspension includes using a dispersant to vaporize the mixture suspension.

In an embodiment of the invention, the step of depositing the vaporized droplets on the substrate includes using air as a carrier gas to deposit the vaporized droplets on the substrate.

In an embodiment of the invention, the step of depositing the vaporized droplets on the substrate further includes using an inert gas to bring the vaporized droplets into a plasma to conduct a plasma reaction. A plurality of plasma treated zeolite crystals, silicon colloids, and mesoporous particles are then obtained, wherein the plasma treated zeolite crystals, silicon colloids, and mesoporous particles are deposited on the substrate.

In an embodiment of the invention, the inert gas is argon, and the flow rate of the argon is 60 cc to 200 cc per minute.

In an embodiment of the invention, the plasma is generated by applying a voltage of 60 V to 90 V.

In an embodiment of the invention, the pore sizes of the macroporous structures are between 2 µm and 3 µm.

In an embodiment of the invention, the pore sizes of the mesoporous structures are between 1.5 nm and 3 nm.

In an embodiment of the invention, the pore sizes of the microporous structures are between 0.5 nm and 0.7 nm.

In an embodiment of the invention, the dielectric constant of the zeolite composite film is less than 2.3.

In an embodiment of the invention, the set volume ratio of the mesoporous particle suspension to the upper layer suspension is 3.8:1 in the mixture suspension.

Based on the above, the invention provides a fabrication of a zeolite composite film, wherein a suspension including a plurality of zeolite crystals and a plurality of silicon colloids is mixed with a mesoporous particle suspension including a plurality of mesoporous particles according to a set ratio. Then, the mixture suspension obtained by mixing is vaporized to form vaporized droplets, and the vaporized droplets are deposited on a heated substrate. Accordingly, a zeolite composite film having a regular macroporous-mesoporousmicroporous structure is obtained, wherein the zeolite composite film fabricated has higher adhesion and lower roughness.

In order to make the aforementioned features and advantages of the invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of the specification. The drawings illustrate embodiments of the invention and, together with the description, serve to explain the principles of the invention.

FIG. 1 is a flow chart illustrating the fabrication of a zeolite composite film according to the first embodiment of the invention.

DESCRIPTION OF THE EMBODIMENTS

Figure 2A:
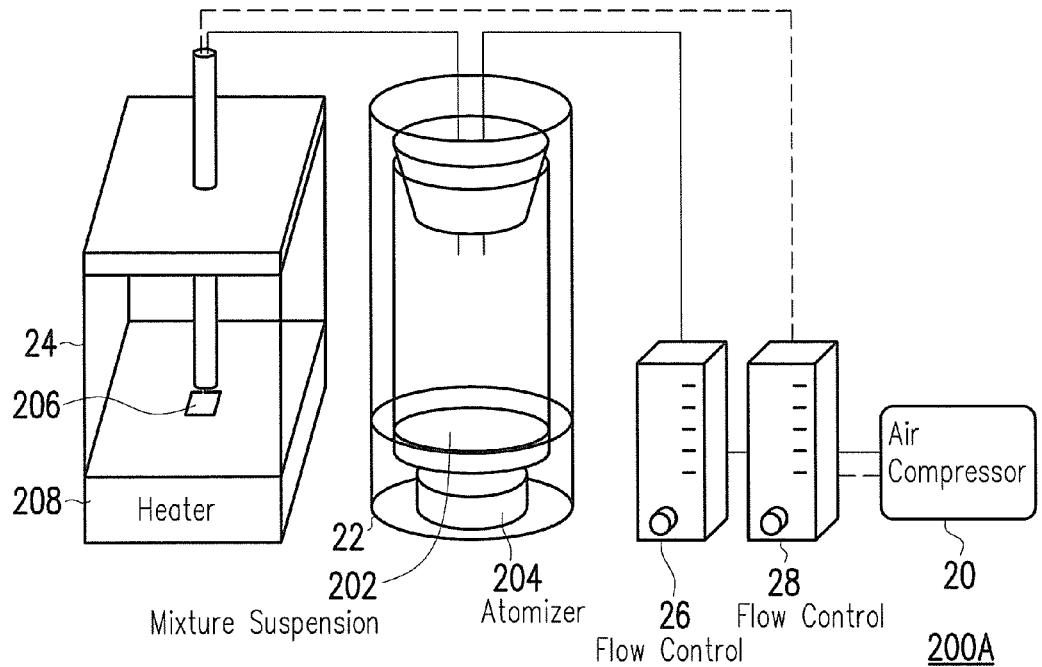
FIG. 2A is a system block diagram illustrating the fabrication of a zeolite composite film according to the first embodiment of the invention.

The invention provides a fabrication of a zeolite composite film that may fabricate a zeolite composite film having better quality, by using a suspension solution including a plurality of zeolite crystals and a plurality of silicon colloids, and a mesoporous particle suspension including a plurality of mesoporous particles. Accordingly, the fabrication may reduce the roughness of the zeolite composite film and increase the adhesion between the zeolite composite film and the substrate. In order to make the invention more comprehensible, exemplary embodiments are provided below to prove that the invention can in actuality be realized.

First Embodiment

FIG. 1 is a flow chart illustrating the fabrication of a zeolite composite film according to the first embodiment of the invention. Referring to FIG. 1, as illustrated in step S102, a composition of water, aluminum isopropoxide, TMAH, and TEOS is mixed according to a set ratio to form a first mixture, and the first mixture is hydrolyzed by stirring in room temperature. Then, the first mixture is heated to obtain a second mixture.

Specifically, the first mixture may be fabricated using a conventional method, such as the fabrication of a nano Faujasite zeolite provided by the team led by Svetlana Mintova in 1999 (Svetlana Mintova, Norman H. Olson and Thomas Bein, "Electron Microscopy Reveals the Nucleation Mechanism of Zeolite Y from Precursor Colloids," *Angew. Chem. Int. Ed.*, vol. 38, 21, 3201-3204, 1999), wherein the nano Faujasite zeolite has a uniform pore size distribution, and the pore sizes of the larger microporous structures are between 0.5 nm and 0.7 nm. The three-dimensional pore structure is called a supercage. In the embodiment, the first mixture is fabricated with the set ratio expressed by the mole ratio 0.15 $Na_2O$:5.5 $(TMA)_2O$:2.3 $Al_2O_3$:10 $SiO_2$:570 $H_2O$, and the first mixture is hydrolyzed by stirring in room temperature for 24 hours. Then, the first mixture is heated at 90° C. for 72 hours to obtain a second mixture. It should be mentioned that, the composition ratio of the first mixture may be adjusted according to demand to achieve the same effect, provided the composition ratio of the zeolite satisfies $M_{x/n}[(AlO_2)_x(SiO_2)_y]$ .$mH_2O$, and x≤y. However, the composition ratio of the first mixture should not be limited by the disclosure of the present experimental example. The M is a cation, the n is the oxidation number of the cation M, wherein the cation M is, for instance, an alkali metal, alkaline earth, a rare earth metal, ammonia, or a hydrogen ion, but is not limited thereto.

In step S104, the second mixture is centrifuged and the upper layer suspension obtained from the centrifugation of the second mixture is taken. In this embodiment, the second mixture is first centrifuged at 4000 rpm for 30 minutes, and the upper layer suspension is obtained by absorbing the upper layer of this centrifuged second mixture using a micropipette. Herein, the upper layer suspension includes a plurality of zeolite crystals and a plurality of silicon colloids, and the particle sizes of the zeolite crystals are less than 50 nm. and the solution in the top layer of the second mixture is taken after the centrifugation to obtain the upper layer suspension.

In step S106, a mesoporous particle suspension is fabricated. The mesoporous particle suspension includes a plurality of mesoporous particles, and each mesoporous particle includes a plurality of pores and a plurality of templating agents inside the pores. In the present embodiment, the mesoporous particles are, for instance, MCM-41 particles of a M41S mesoporous material. Of course, in other embodiments, the mesoporous particles may also be MCM-48 particles or MCM-50 particles, and are not limited to MCM-41 particles. For ease of explanation, the following uses MCM-41 particles as examples.

Specifically, the mesoporous particle suspension may be fabricated using a conventional method, such as the fabrication provided by the team led by Hiroaki Imai in 2005 (Kenichi Ikari, Keisei Suzuki, and Hiroaki Imai, "Structural Control of Mesoporous Silica Nanoparticles in a Binary Surfactant System," *Langmuir*, 22, 802-806, 2006), wherein a silicon source and a dual surface active agent are used to form mesoporous particles. According to the fabrication provided by the team led by Hiroaki Imai, the silicon source of the present embodiment is, for instance, tetraethosiloxane (TEOS). The dual surface active agent is, respectively, a cationic surface active agent and a non-ionic surface active agent, wherein the cationic surface active agent is, for instance, cetyl trimethyl ammonium bromide (CTAB), and the non-ionic surface active agent is, for instance, F-127 ($EO_{106}PO_{60}EO_{106}$). The mesoporous particle suspension including MCM-41 particles is fabricated accordingly.

Furthermore, the mesoporous particle suspension of the present embodiment is fabricated according to the set ratio expressed by the mole ratio 0.52 TEOS:0.25 CTAB:0.0049 F-127:1.54 $NH_4OH$. In particular, after the TEOS is hydrolyzed in pH=0.5HCl, CTAB and F-127 are added. Then, $NH_4OH$ is added to react in an alkali environment, and the mesoporous particle suspension including MCM-41 particles is formed.

In step S108, a heat treatment is applied to the substrate, wherein the temperature of the heat treatment applied to the substrate is between 250° C. and 400° C. Preferably, in the present embodiment, a pretreatment may be performed before heating the substrate in order to facilitate the subsequent formation of the zeolite composite film. Moreover, the selection of the substrate may be a silicon chip, an aluminum oxide substrate, an indium tin oxide (ITO) conductive glass, or various other industrial substrates, but is not limited thereto.

In step S110, the upper layer suspension and the mesoporous particle suspension are mixed to form a mixture suspension, and the mixture suspension is vaporized to form a plurality of vaporized droplets. Specifically, the best set volume ratio of the mesoporous particle suspension to the upper layer suspension is 3.8:1 in the mixture suspension, which may contribute to higher adhesion of the zeolite composite film. In addition, an atomizer may be used to vaporize the mixture suspension, and the intensity of the atomizer may be controlled so the sizes of the vaporized droplets are uniform. Moreover, the atomizer of the present embodiment is, for instance, an ultrasonic oscillator. Of course, in other embodiments, it will be apparent to one of the ordinary skill in the art that other methods may also be used to vaporize the mixture suspension, and therefore are not specified here.

In step S112, the vaporized droplets are deposited on a substrate to remove the templating agents in the mesoporous particles and to form the zeolite composite film, wherein the zeolite composite film includes a plurality of macroporous structures, a plurality of mesoporous structures, and a plurality of microporous structures. The macroporous structures, the mesoporous structures, and the microporous structures may be regularly arranged.

For the fabrication of the zeolite composite film, the invention also provides a corresponding fabrication system for the zeolite composite film. Below is another embodiment for further explanation.

FIG. 2A is a system block diagram illustrating the fabrication of a zeolite composite film according to the first embodiment of the invention. Referring to FIG. 2A, the fabrication system 200A includes an air compressor 20, an atomization tank 22, a reaction chamber 24, and flow controls 26 and 28. The atomizer tank 22 includes a mixture suspension 202 and an atomizer 204, and the reaction chamber 24 includes a substrate 206 and a heater 208.

Specifically, in the present embodiment, the mixture suspension 202 is formed by mixing the upper layer suspension and the mesoporous particle suspension, wherein the upper layer suspension includes a plurality of zeolite crystals and a plurality of silicon colloids. Then, the mixture suspension 202 is disposed in the atomizer tank 22, and the mixture suspension 202 is vaporized using the atomizer 204. Here, the mixture suspension 202 may be vaporized by the atomizer 204 to form a plurality of vaporized droplets. On the other hand, the substrate 206 is heated to about 350° C. by the heater 208.

Then, a carrier gas is provided by the air compressor 20, and the flow rate of the carrier gas is controlled by the flow controls 26 and 28 to bring the vaporized droplets into the reaction chamber 24. After the flow rate of the carrier gas is stabilized, the flow rate of the carrier gas is controlled by the flow controls 26 and 28 to deposit the vaporized droplets on the heated substrate 206, and the deposited film is left at 350° C. for 5 minutes. Accordingly, a zeolite composite film having a regular macroporous-mesoporous-microporous structure is obtained.

It should be mentioned that, the thickness of the zeolite composite film of the present embodiment is related to the duration of the deposition of the vaporized droplets on the heated substrate 206. That is, under the same process parameters (for instance, the temperature of the substrate 206, the flow rate of the flow controls 26 and 28), the longer the time of the deposition, the thicker the zeolite composite film. For instance, in the embodiment, when the vaporized droplets are continuously deposited on the substrate 206 for 1 minute, the thickness of the fabricated zeolite composite film is 90 nm. The thickness of the fabricated zeolite composite film is 280 nm when the vaporized droplets are deposited for 3 minutes. The thickness of the fabricated zeolite composite film is 480 nm when the vaporized droplets are deposited for 5 minutes. In other words, the thickness of the zeolite composite film may be controlled by changing the duration of the deposition or changing the process parameters. Therefore, controlling the thickness of a zeolite composite film using the method in the invention is simpler and easier than that of the current fabrication of a zeolite composite film.

Based on the above, in the fabrication of a zeolite composite film of the present embodiment, an upper layer suspension including zeolite crystals and silicon colloids is mixed with a mesoporous particle suspension including mesoporous particles to form a mixture suspension 202. Then, the mixture suspension 202 is vaporized to form vaporized droplets, and air is used as a carrier gas to deposit the vaporized droplets on a heated substrate 206. Accordingly, in the present embodiment, the process parameters (for instance, the temperature of the substrate 206 and the flow rate of the flow controls 26 and 28) may be adjusted to fabricate a zeolite composite film having a regular macroporous-mesoporous-microporous structure. The zeolite composite film may also have higher adhesion. On the other hand, when the vaporized droplets are deposited on the substrate 206, the templating agents in the mesoporous particles may be removed. Therefore, the present embodiment provides a very green process that does not use a conventional high temperature calcination process to remove the templating agents in the mesoporous particles.

It should be mentioned that, in the fabrication of the zeolite composite film, the method of depositing the vaporized droplets on the substrate 206 may also be achieved with a plasma process in a plasma system, as explained in the following embodiment.

Second Embodiment

The present embodiment is similar to the first embodiment, and the two are different in that the present embodiment may use an inert gas to bring the vaporized droplets of the mixture suspension into a plasma to conduct a plasma reaction in order to obtain a plurality of plasma treated zeolite crystals, silicon colloids, and mesoporous particles. Furthermore, the plasma reaction is completed by a plasma under atmospheric pressure. That is, an atmospheric plasma system is used, wherein the plasma is generated by, for instance, applying a voltage of 60 V to 90 V. Or, the plasma may also be generated by applying a pulsed ac voltage of 60 V to 90 V. In theory, the higher the voltage, the better the vaporized droplets deposit and the better the zeolite composite film forms. However, when the voltage of the plasma is greater than 90 V, electric arcs occur.

Furthermore, the inert gas is, for instance, argon, wherein the flow rate provided ranges between 6 L/m and 50 L/m (slm). In a preferable embodiment, the flow rate of the argon is, for instance, 10 L/m (slm). Moreover, the flow rate of the vaporized droplets ranges between 60 cc/min and 200 cc/min. In a preferable embodiment, the flow rate of the vaporized droplets is, for instance, 100 cc/min.

Figure 2B:
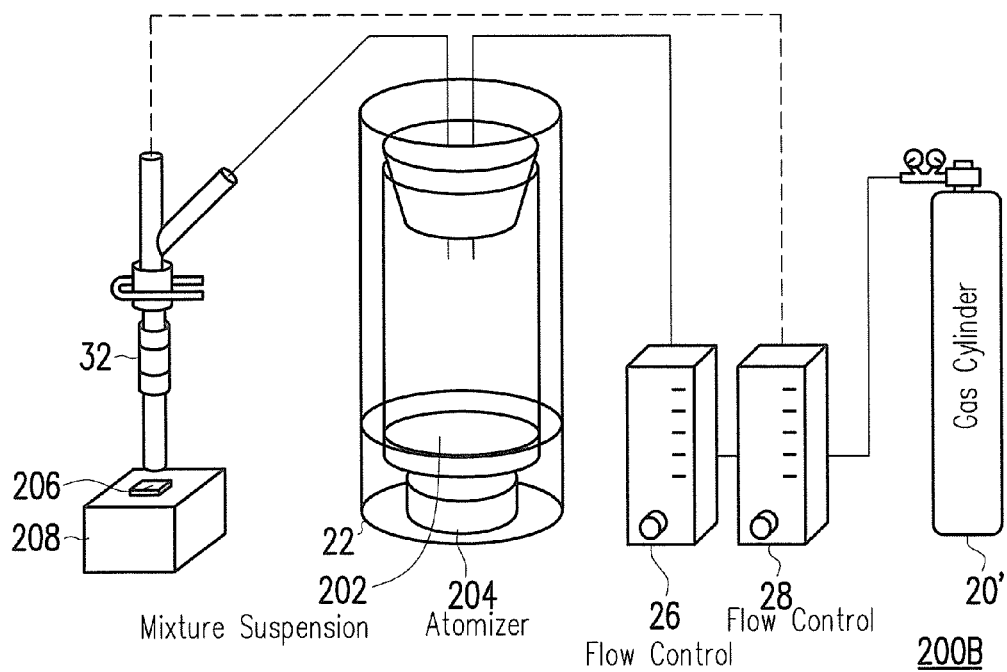
FIG. 2B is a system block diagram illustrating the fabrication of a zeolite composite film according to the second embodiment of the invention.

FIG. 2B is a system block diagram illustrating the fabrication of a zeolite composite film according to the second embodiment of the invention. Referring to FIG. 2A and FIG. 2B, the fabrication system 200B of the present embodiment is similar to the fabrication system 200A of the first embodiment. However, the present embodiment and the embodiment of FIG. 2A are different in that the fabrication system 200B of the present embodiment includes a gas cylinder 20', and the fabrication system 200B may further include a plasma generator 32.

Specifically, in the present embodiment, the gas cylinder 20' may be used to provide an inert gas, and the flow controls 26 and 28 may be used to control the flow rate of the inert gas in order to bring the mixture suspension 202 into the plasma generator 32 to conduct a plasma reaction, and to obtain plasma treated zeolite crystals, silicon colloids, and mesoporous particles. Then, the plasma treated zeolite crystals, silicon colloids, and mesoporous particles are deposited on a heated substrate 206 to remove the templating agents in the mesoporous particles, and to obtain the zeolite composite film. The temperature of the substrate 206 may be maintained between 250° C. and 400° C. by the heater 206.

Furthermore, in the present embodiment, the distance between the substrate 206 and the outlet of the plasma generator 32 is between 3 mm and 5 mm. When the distance is less than 3 mm, electric arcs may easily be generated in the plasma system. In a preferable embodiment, the distance between the substrate 206 and the outlet of the plasma generator 32 is about 5 mm.

Based on the above, in the present embodiment, templating agents in mesoporous particles may be removed by a heat treatment of a substrate and a plasma process in order to fabricate a zeolite composite film having a regular macroporous-mesoporous-microporous structure. Accordingly, the zeolite composite film obtained using the present fabrication may be closely and evenly stacked. The zeolite composite film also has higher adhesion, and satisfies application needs.

The following experimental examples are used to further explain the above embodiments. However, it should be understood that, the experimental examples are only exemplary explanations, and should not be used to limit the implementation of the invention.

EXPERIMENTAL EXAMPLES

First Experimental Example

In the following, the detailed steps of the fabrication of the first experimental example are explained using the various components of FIG. 2A.

Fabrication of Upper Layer Suspension

A first mixture is obtained by measuring and evenly mixing $H_2O$, aluminum isopropoxide, (TMAOH), and TEOS according to the mole ratio 0.15 $Na_2O$:5.5 $(TMA)_2O$:2.3 $Al_2O_3$: $10SiO_2$:570 $H_2O$. Then, after the first mixture is hydrolyzed in room temperature for 24 hours, the first mixture is disposed in an autoclave at 90° C. for 72 hours to obtain a second mixture. The second mixture is taken from the autoclave and cooled. Then, the second mixture is centrifuged at 11,000 rpm for 30 minutes, and the solution in the top layer is taken to obtain the upper layer suspension. The upper layer suspension includes a plurality of silicon colloids and a plurality of zeolite crystals having particle sizes less than 50 nm.

Figure 3A:
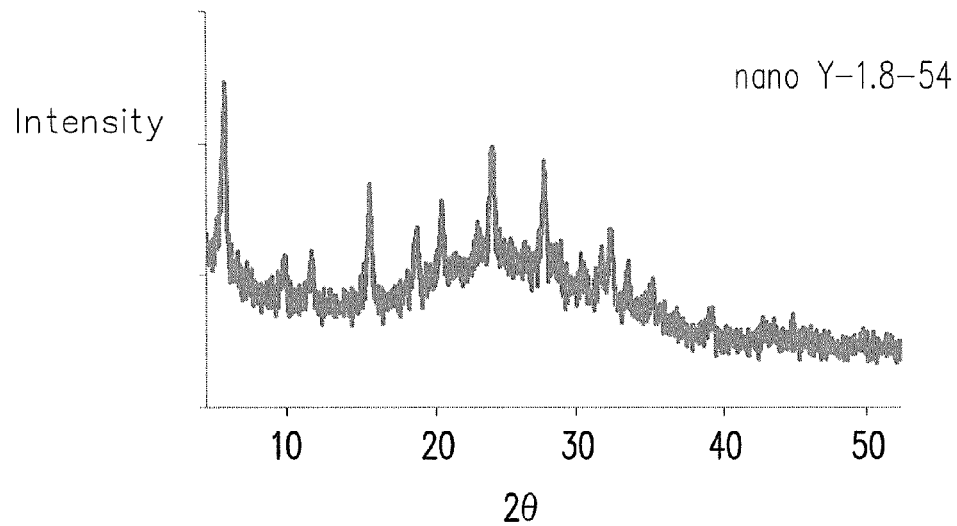
FIG. 3A is an X-ray diffractometer (XRD) absorption spectrum of an upper layer suspension of the first experimental example of the invention.

FIG. 3A is an X-ray diffractometer (XRD, Model PANalytical X'PERT PRO) absorption spectrum of the upper layer suspension of the first experimental example of the invention. It is observed from FIG. 3A that, when 2θ is between 5 degrees and 45 degrees, some sharper signals exist, and the signals correspond to the main signals used to identify the Faujasite zeolite crystals in the reference literature. Moreover, a wider range of FIG. 3A corresponds to the signals in the reference literature where large amounts of colloid materials exist. Accordingly, the existence of colloid materials and tiny Faujasite zeolite crystals in the upper layer suspension fabricated may be confirmed by identifying the upper layer suspension with the XRD, wherein the Faujasite zeolite has a uniform pore distribution, and the pore size of the largest microporous structure is between 0.5 nm and 0.7 nm.

Fabrication of Mesoporous Particle Suspension

The mesoporous particle suspension is fabricated with the set ratio expressed by the mole ratio 0.52 TEOS:0.25 CTAB: 0.0049 F-127:1.54 $NH_4OH$. The TEOS, the CTAB, and the F-127 are separately dissolved in pH=0.5HCl and then mixed and stirred for 3 hours. Then, $NH_4OH$ is added, and the solution is stirred in room temperature for 24 hours. After centrifuging at 11,000 rpm, the mesoporous particle suspension including MCM-41 particles (mesoporous particles) is obtained by taking the solution in the lower layer.

Figure 3B:
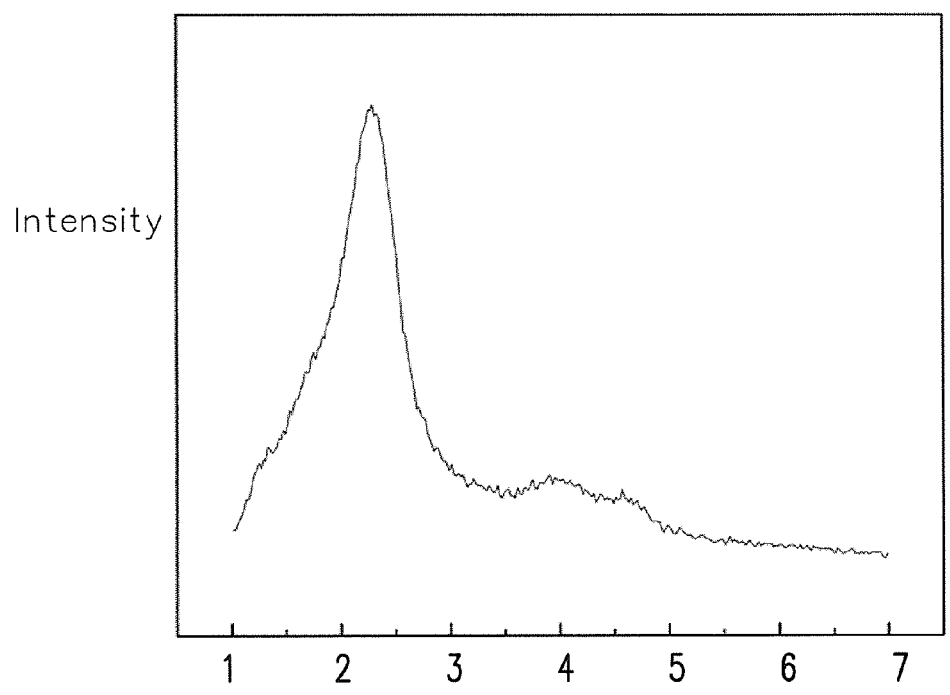
FIG. 3B is an XRD absorption spectrum of a mesoporous particle suspension of the first experimental example of the invention.

FIG. 3B is an XRD absorption spectrum of the mesoporous particle suspension of the first experimental example of the invention. It is known from FIG. 3B that, when 2θ is between 1 degree and 7 degrees, signals exist at 2.2 degrees, 4.2 degrees, and 4.9 degrees, and the signals correspond to the main signals used to identify the MCM-41 particles in the reference literature. Accordingly, the existence of MCM-41 particles in the mesoporous particle suspension fabricated may be confirmed by identifying the mesoporous particle suspension with the XRD, wherein the pore sizes of the known MCM-41 are between 1.5 nm and 3 nm.

Pretreatment of Substrate

The substrate 206 of the present experimental example is, for instance, a silicon chip. Specifically, in the present experimental example, a tungsten pen may be used to cut the silicon chip into a size of 1×1 cm². The cut silicon chip is then bathed in acetone to conduct ultrasonic oscillation for 15 minutes. Then, the silicon chip is rinsed with water, after which the silicon chip is bathed in ethanol to conduct ultrasonic oscillation for another 15 minutes. After rinsing, the silicon chip is bathed in ethanol. Before the deposition experiment, the silicon chip is taken from the ethanol and blasted with a nitrogen gun to complete the pretreatment of the substrate 206.

Fabrication of Zeolite Composite Film 1 ml of the upper layer suspension is taken and water is added thereto to make a 10 ml solution. The solution is mixed with 20 ml of mesoporous particle suspension including MCM-41 particles to obtain the mixture suspension 202. Table 1 below shows a relationship among the dielectric constant and the quality of adhesion of the zeolite composite film and different volume ratios of the mesoporous particle suspension to the upper layer suspension. It is known from Table 1 that the set volume ratio of the mesoporous particle suspension to the upper layer suspension may influence the dielectric constant and adhesion of the zeolite composite film. According to Table 1, the best set volume ratio of the mesoporous particle suspension to the upper layer suspension is 3.8:1 in the mixture suspension, which may contribute to a substantially lower dielectric constant and higher adhesion of the zeolite composite film.

TABLE 1

| mesoporous particle suspension:upper layer suspension (v/v) | dielectric constant | the quality of adhesion |
|---|---|---|
| 7.5:1 | 2.08 | bad |
| 3.8:1 | 2.15 | good |
| 2.5:1 | 2.65 | good |

Moreover, ethanol is used as a dispersant, and ethanol is added to the mixture suspension 202 so the zeolite crystals, the silicon colloids, and the MCM-41 particles precipitated in the mixture suspension 202 may be thoroughly dispersed in the mixture suspension 202. The mixture suspension 202 is disposed in the atomizer tank 22, and the mixture suspension 202 is vaporized using the atomizer 204 to form a plurality of vaporized droplets.

On the other hand, the substrate 206 is disposed in the reaction chamber 24, and the substrate 206 is heated to 350° C. by the heater 208.

Then, the air compressor 20 is used to provide air as a carrier gas to carry the vaporized droplets, and the flow rate of the carrier gas is controlled by the flow controls 26 and 28 to deposit the vaporized droplets on the heated substrate 206. It should be mentioned that, in order to obtain the zeolite composite film having pore sizes of 2 μm to 3 μm (macroporous structures), by this point, the deposited substrate 206 has been left at 350° C. for 5 minutes. As a result, the zeolite composite film having a regular macroporous-mesoporous-microporous structure is obtained.

It is mentioned here that, in the present experimental example, a thermogravimetry analyzer (TGA)-derivative thermogravimetry (DTG) may be used to obtain the pyrolysis temperature of the templating agents in the MCM-41 particles. The temperature of the heater 208 needed to heat the substrate 206. That is, the temperature of the substrate 206, may be controlled according to the pyrolysis temperature.

Figure 4:
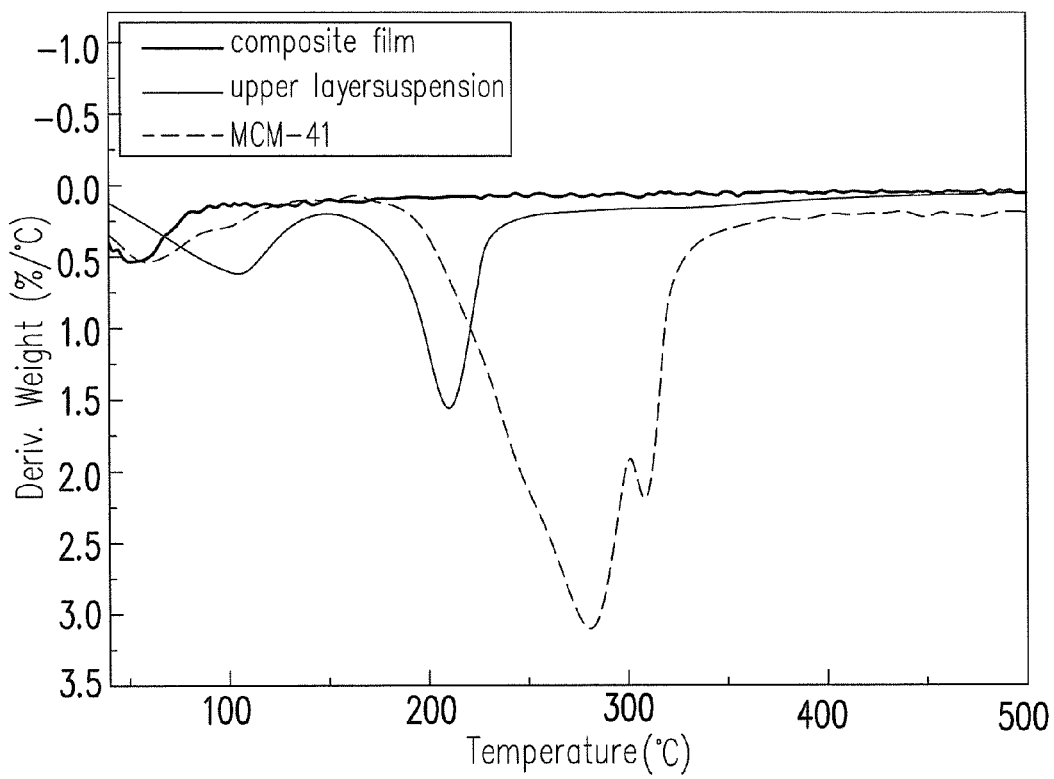
FIG. 4 is a thermogravimetry analyzer-derivative thermogravimetry (TGA-DTG) thermogravimetric analysis diagram of uncalcined MCM-41 particles of the first experimental example of the invention.

FIG. 4 is a TGA-DTG thermogravimetric analysis diagram of the unculcined MCM-41 particles of the first experimental example of the invention. Referring to FIG. 4, the mass loss may be divided into three stages, wherein when the temperature is between 25° C. and 100° C., the mass loss of the MCM-41 particles is about 4%. When the temperature is between 120° C. and 310° C., the mass loss of the MCM-41 particles is about 28%. When the temperature is greater than 310° C., the mass loss of the MCM-41 particles is about 6%. Moreover, the loss of the total mass of the MCM-41 particles is about 38%. It is known from FIG. 4 that, 210° C. is the decomposition temperature of zeolite crystals and silicon colloids in the upper layer suspension, 280° C. is the decomposition temperature of the MCM-41 particles, and 310° C. is the temperature at which mass loss occurs, wherein the mass loss is caused by the remaining organic substances carbonizing and then oxidizing to become carbon dioxide. As shown in FIG. 4, most of the templating agents in both the MCM-41 particles and the upper layer suspension are removed. Accordingly, in a preferable embodiment, when the substrate 206 is heated to greater than 280° C. by the heater 208, the templating agents in the MCM-41 particles may be removed during the process of depositing the vaporized droplets on the substrate 206.

Moreover, in the present experimental example, a Fourier transform infrared spectroscopy (FT-IR) may also be used to obtain the temperature of the substrate 206 and the temperature of the templating agents in the MCM-41 particles.

Figure 5:
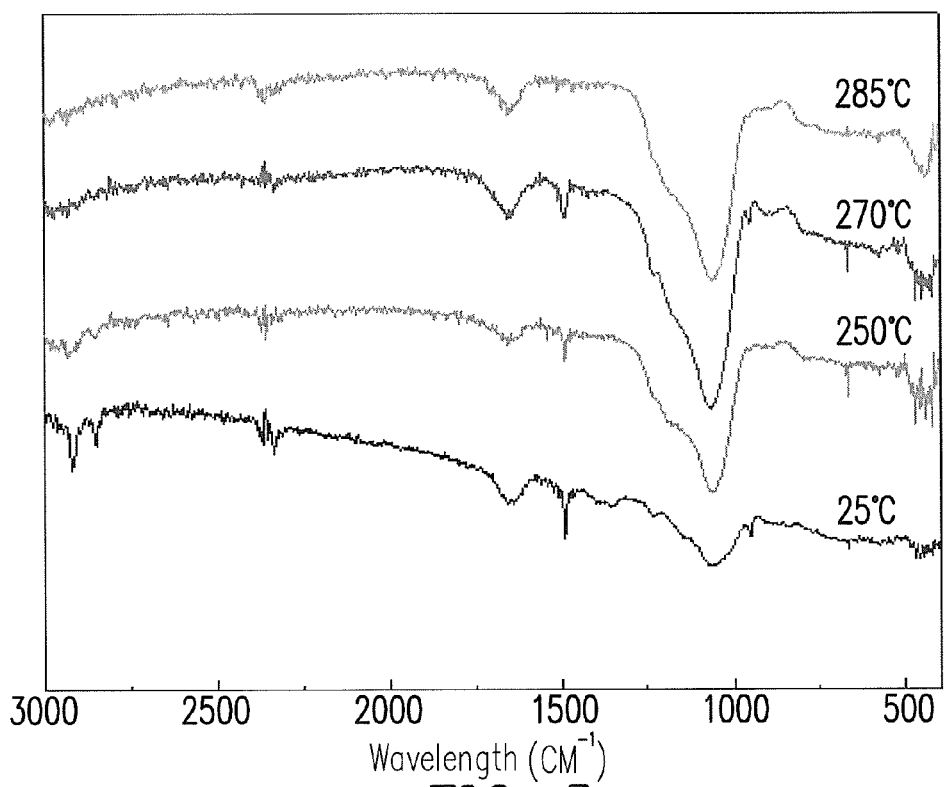
FIG. 5 is a Fourier transform infrared spectroscopy (FT-IR) absorption spectrum of mesoporous particles of the first experimental example of the invention.

FIG. 5 is an FT-IR absorption spectrum of the mesoporous particles of the first experimental example of the invention. Referring to FIG. 5, FIG. 5 illustrates an absorption spectrum of the MCM-41 particles deposited on the substrate 206 having different temperatures, and it is apparent that, when the temperature of the substrate 206 is between 250° C. and 270° C., signals of templating agents exist at the wavelengths 2850 cm$^{-1}$, 2930 cm$^{-1}$, and 1488 cm$^{-1}$. However, when the temperature of the substrate 206 is 285° C., signals of templating agents are absent at the wavelengths 2850 cm$^{-1}$, 2930 cm$^{-1}$, and 1488 cm$^{-1}$. It is therefore proven that, when the temperature of the substrate 206 is maintained at 285° C., the templating agents in the MCM-41 particles may completely disappear. Therefore, the present experimental example selects a temperature greater than 285° C. as the temperature of the substrate 206 to fabricate the zeolite composite film.

Table 2 below is a specific surface area analysis of different samples using the BET method (Brunauer-Emmitt-Teller, Model Nova 1000e). It is known from Table 2 that, the specific surface area of the nanoscale pure silicon MCM-41 particles increases from 134.5 m²/g to 1,009.7 m²/g after calcination, and the specific surface area of the nanoscale pure silicon MCM-41 particles also increases to 895.5 m²/g after vaporization and deposition. Since the zeolite composite film includes an upper layer suspension, wherein the upper layer suspension includes zeolite crystals and silicon colloids, larger macropores (pore sizes of about 2 μm to 3 μm) may be formed on the zeolite composite film at high temperature, so that the specific surface area of the fabricated zeolite composite film is close to 623.4 m²/g. It is therefore proven that, compared to the nanoscale pure silicon MCM-41 particles before calcination, the specific surface area of the zeolite composite film still rises to a certain extent. It is also proven that, when the temperature of the substrate 206 is 285° C., most of the templating agents in the MCM-41 particles of the present experimental example may be removed.

TABLE 2

| Sample | Specific Surface Area (m²/g) |
| --- | --- |
| Nanoscale Pure Silicon MCM-41 Before Calcination | 134.5 |
| Nanoscale Pure Silicon MCM-41 After Calcination | 1009.7 |
| Nanoscale Pure Silicon MCM-41 After Vaporization and Deposition | 895.5 |
| Zeolite Composite Film | 623.4 |

Identification of Zeolite Composite Film

1. Surface Tension Analysis:

To explain the surface tension property of the zeolite composite film, contact angle measurement (abbreviated CA, provided by NICOLET, Model 5700) is used in the present experimental example to measure the surface tension of the zeolite composite film and to determine the hydrophilicity/hydrophobicity of the zeolite composite film, wherein glycerol (surface tension 63 dynes/cm) is used as the solvent.

Figure 6A:
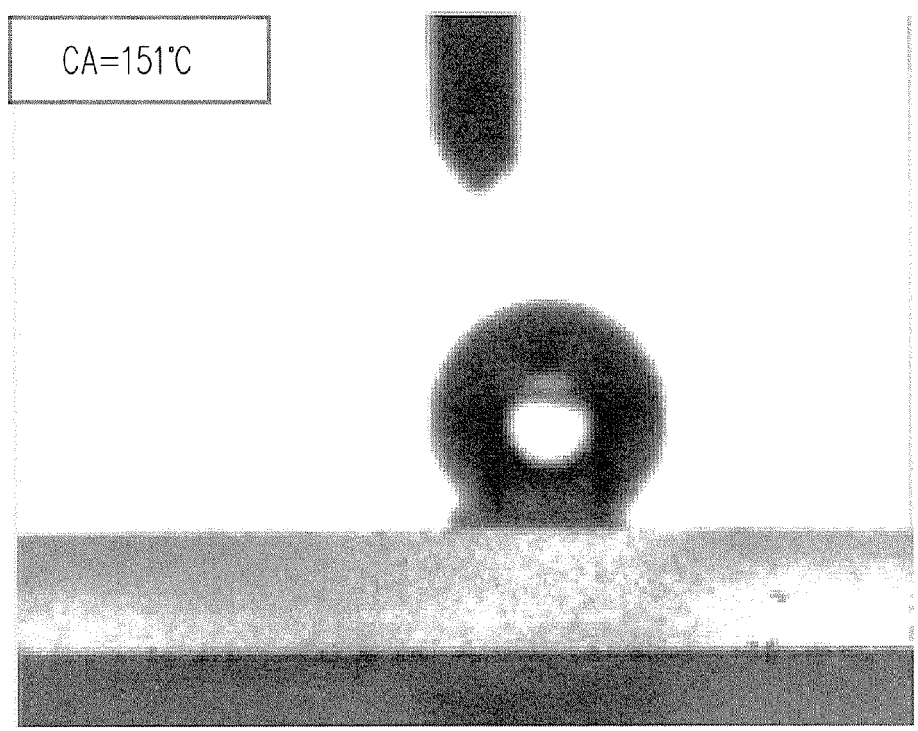
FIG. 6A is a micrograph of a zeolite composite film of the first experimental example of the invention.
Figure 6B:
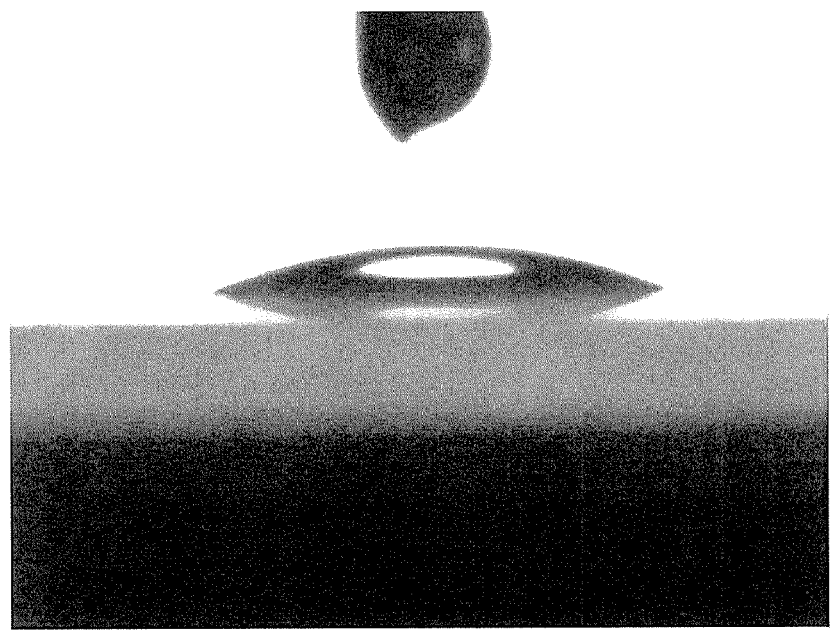
FIG. 6B is a micrograph of a vaporized and deposited suspension including nanoscale pure silicon MCM-41 particles.

FIG. 6A is a micrograph of the zeolite composite film of the first experimental example of the invention. FIG. 6B is a micrograph of a suspension including nanoscale pure silicon MCM-41 particles after vaporization and deposition (that is, the nanoscale pure silicon MCM-41 thin film of the prior art), wherein the suspension does not include an upper layer suspension, and therefore does not include zeolite crystals and silicon colloids.

Referring to FIG. 6A, the contact angle of the zeolite composite film is about 151°, and the added glycerol droplet forms a spherical shape on the zeolite composite film, indicating the zeolite composite film is hydrophobic. However, referring to FIG. 6B, the contact angle of the nanoscale pure silicon MCM-41 thin film is about 21°. That is, the surface tension of the nanoscale pure silicon MCM-41 thin film is less than the surface tension of the zeolite composite film of FIG. 6A, wherein the added glycerol droplet is flat on the nanoscale pure silicon MCM-41. Therefore, it is shown that the nanoscale pure silicon MCM-41 thin film of the prior art is hydrophilic. It is therefore proven that, the zeolite composite film of the present experimental example has greater surface tension and higher hydrophobicity.

2. Adhesion Analysis:

In the present experimental example, a field emission scanning electron microscope (abbreviated FE-SEM, provided by Hitachi, Model 4700) is utilized to observe the surface of the zeolite composite film.

Figure 7A:
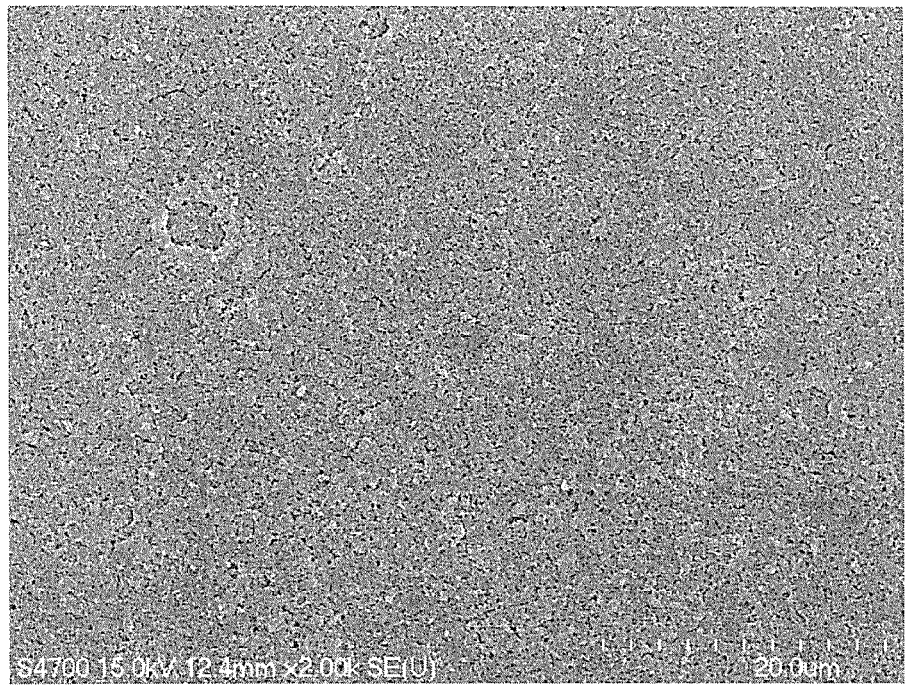
FIG. 7A is a scanning electron microscopy (SEM) micrograph of a zeolite composite film of the first experimental example of the invention fabricated on a substrate having a temperature of 285° C.
Figure 7B:
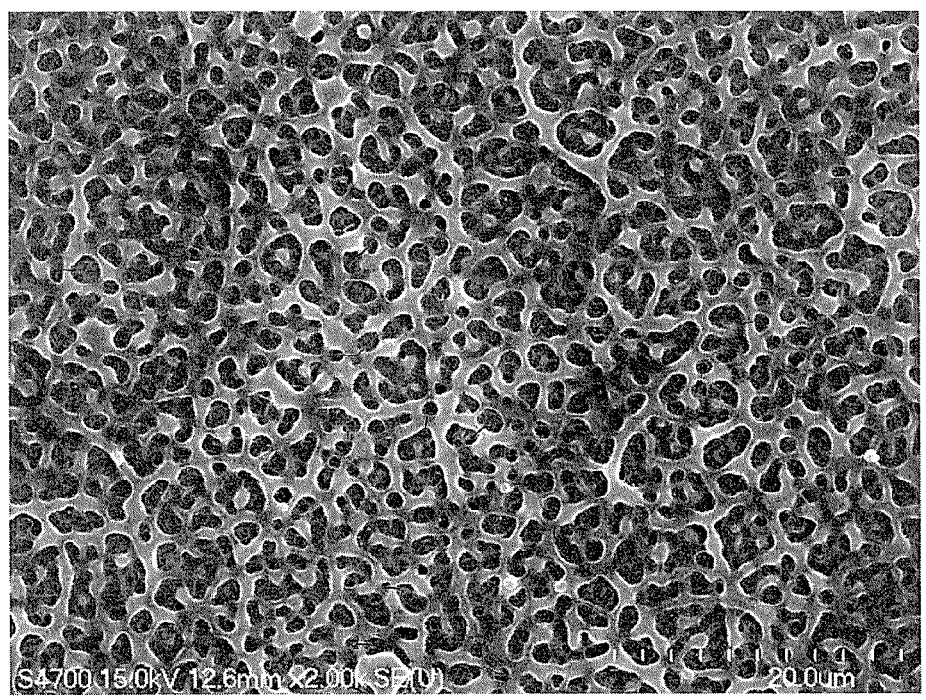
FIG. 7B is an SEM micrograph of a zeolite composite film of the first experimental example of the invention fabricated on a substrate having a temperature of 350° C.
Figure 8A:
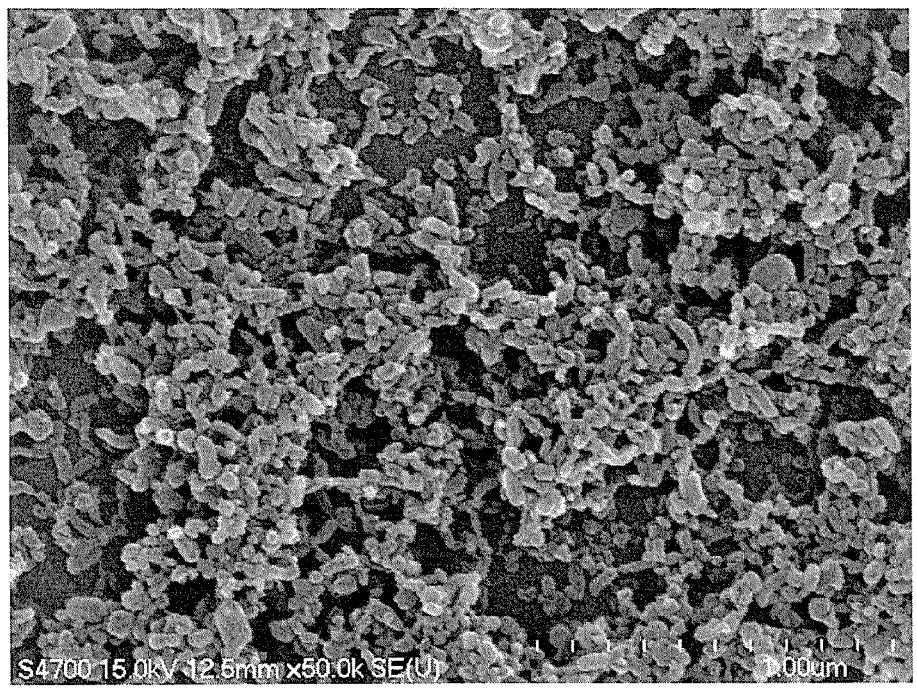
FIG. 8A is an SEM micrograph of a nanoscale pure silicon MCM-41 thin film fabricated on a substrate having a temperature of 285° C.
Figure 8B:
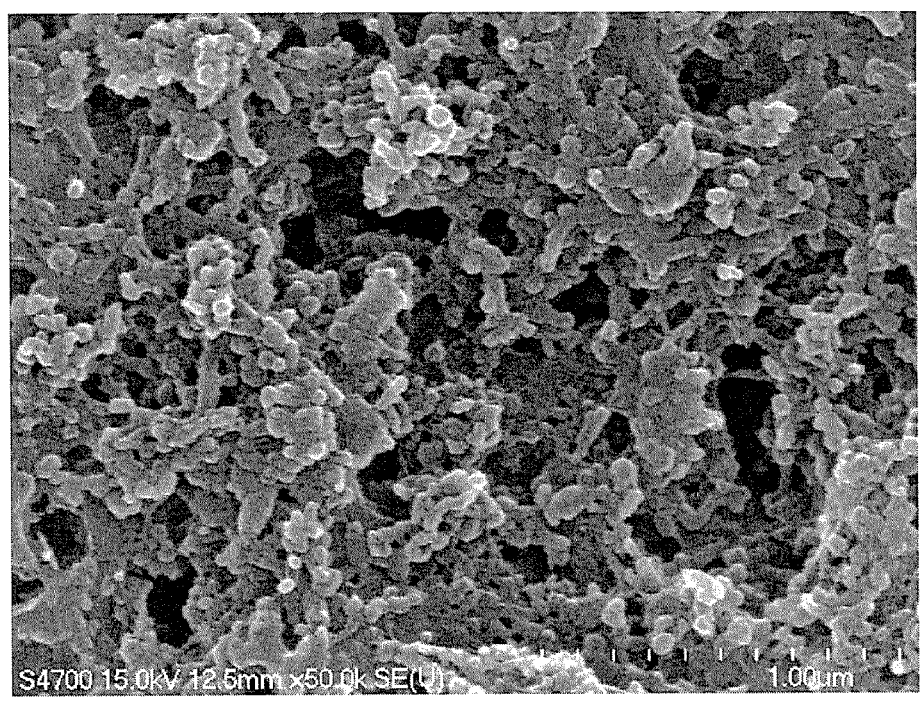
FIG. 8B is an SEM micrograph of a zeolite composite film of the first experimental example of the invention fabricated on a substrate having a temperature of 285° C.

FIG. 7A to FIG. 8B are scanning electron microscopy (SEM) images of the zeolite composite film of the first experimental example of the invention. The zeolite composite film of FIG. 7A is fabricated on the substrate 206 having a temperature of 285° C., and the zeolite composite film of FIG. 7B is fabricated on the substrate 206 having a temperature of 350° C. The magnifications of both FIG. 7A and FIG. 7B are 2,000. The nanoscale pure silicon MCM-41 thin film of FIG. 8A is fabricated on the substrate 206 having a temperature of 285° C., and the zeolite composite film of FIG. 8B is fabricated on the substrate 206 having a temperature of 285° C. The magnifications of both FIG. 8A and FIG. 8B are 100,000.

It is observed from FIG. 7A to FIG. 8B that (FIG. 7A is an image of deposition at 285° C., and FIG. 7B is an image of deposition at 350° C.), at 285° C., a deposited film having only regular particles is formed on the substrate 206. However, when the temperature is increased to 350° C., the silicon colloids in the zeolite composite film are built up on the substrate 206 to form macroporous structures, wherein the pore sizes of the macroporous structures are between 2 μm and 3 μm. Moreover, the MCM-41 particles in the zeolite composite film may provide mesoporous structures, wherein the pore sizes of the mesoporous structures are between 1.5 nm and 3 nm. Moreover, the zeolite crystals in the zeolite composite film may provide microporous structures, wherein the pore sizes of the microporous structures are between 0.5 nm and 0.7 nm. Since the zeolite composite film has a macroporous-mesoporous-microporous structure having various pore sizes, the zeolite composite film having a regular macroporous-mesoporous-microporous structure of the present experimental example may have a higher value in the field of biotechnology related to drug delivery.

On the other hand, it is observed from comparing FIG. 8B and FIG. 8A that, the MCM-41 particles in the zeolite composite film obtained with the present fabrication are embedded in the zeolite crystals and the silicon colloids. It may be acquired that, the zeolite crystals and the silicon colloids in the upper layer suspension may improve the adhesion between the zeolite composite film and the substrate 206.

Figure 9:
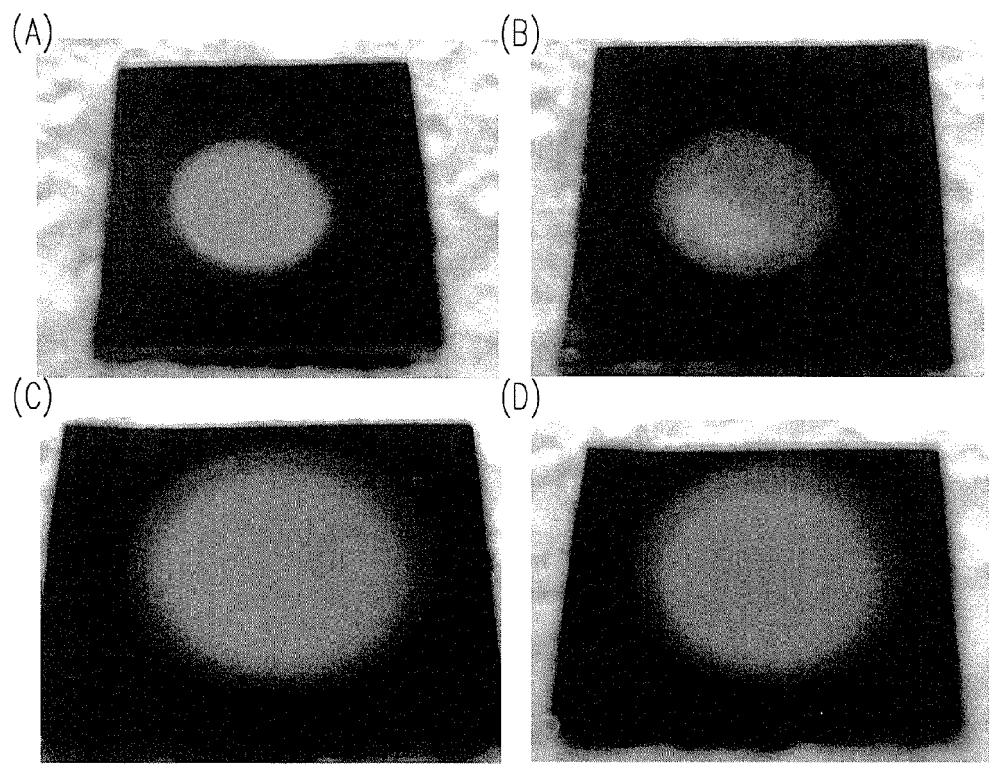
FIG. 9A to FIG. 9B are images of a nanoscale pure silicon MCM-41 thin film before and after an adhesion test.
FIG. 9C to FIG. 9D are images of a zeolite composite film of the first experimental example of the invention before and after an adhesion test.

FIG. 9A to FIG. 9B are images of nanoscale pure silicon MCM-41 thin film formed by the deposition of the vaporized nanoscale pure silicon MCM-41 particles before and after an adhesion test, wherein the nanoscale pure silicon MCM-41 thin film does not have zeolite crystals and silicon colloids in the upper layer suspension. FIG. 9C to FIG. 9D are images of the zeolite composite film of the first experimental example of the invention before and after an adhesion test. Herein, 3M Scotch Cellophane Film Tape 610 conforming to the regulation of CID AA-113 Type 1, Class B and suggested by IPC (The Institute for Interconnecting and Packaging Electronic Circuits) to perform the adhesion test for coating materials is used.

It is apparent from FIG. 9A and FIG. 9B that, after the adhesion test of the nanoscale pure silicon MCM-41 thin film including only nanoscale pure silicon MCM-41 particles, a portion of the nanoscale pure silicon MCM-41 thin film is separated from the substrate. However, it is apparent from FIGS. 9C and 9D that, the zeolite composite film obtained with the present fabrication does not separate from the substrate. It is therefore proven that, the zeolite composite film obtained with the present fabrication has higher adhesion.

Figure 10:
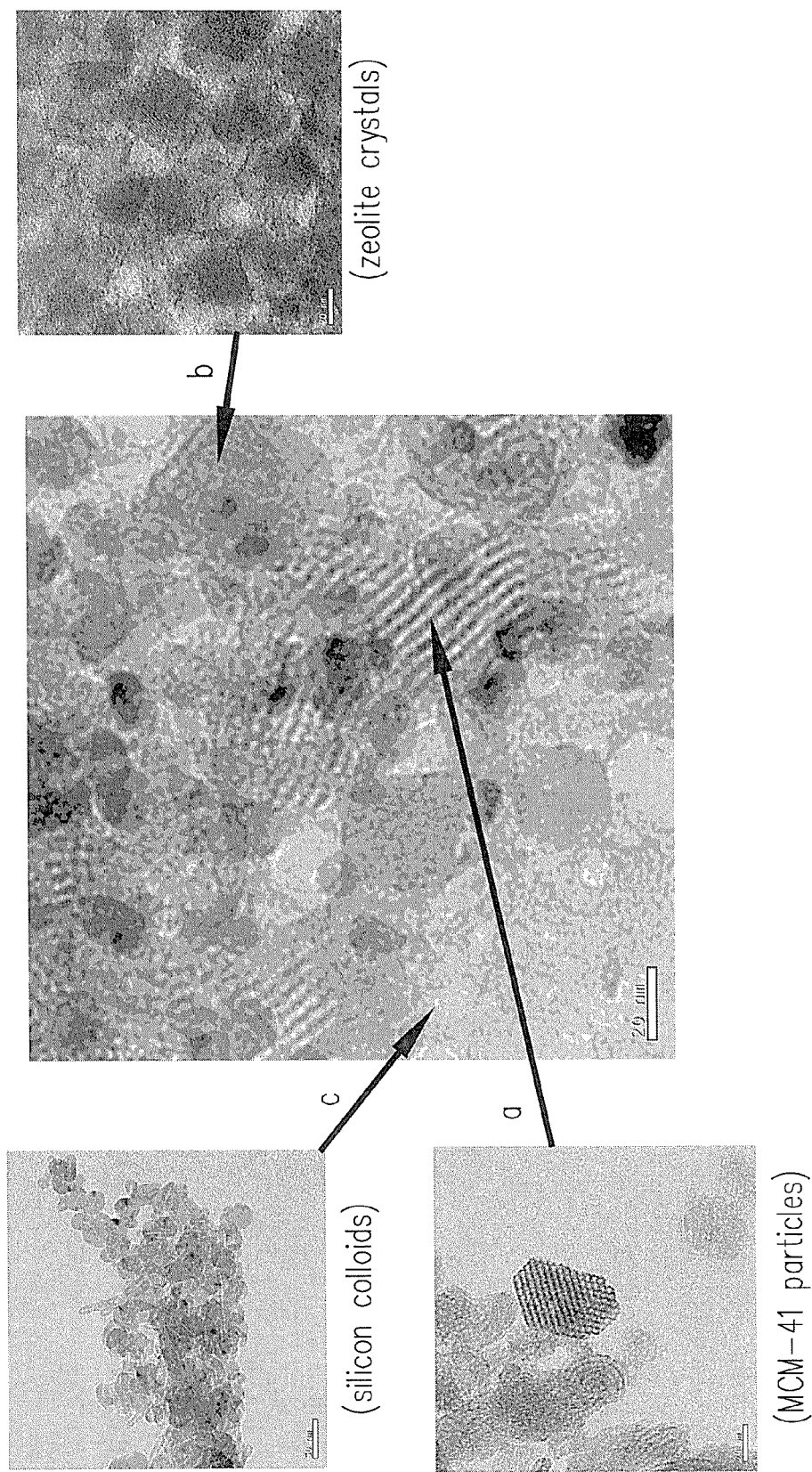
FIG. 10 is a transmission electron microscopy (TEM) micrograph of the first experimental example of the invention.

FIG. 10 is a transmission electron microscopy (TEM, provided by METEK, Model FEI Tecnai G2 20 S-Twin) micrograph of the first experimental example of the invention, wherein arrow a is the MCM-41 particles, arrow b is the zeolite crystals, and arrow c is the silicon colloids with poor crystallinity. It is observed from FIG. 10 that, the zeolite composite film is covered by silicon colloids that form a net structure, thereby increasing the adhesion of the zeolite composite film.

3. Dielectric Property:

To verify the relationship between the frequency and the dielectric constant of the zeolite composite film fabricated with the present fabrication, in the present experimental example, an LCR-meter (provided by HP, Model HP-4294A) is used to measure the capacitance. The dielectric constant (the κ value) is calculated using the capacitance.

Figure 11A:
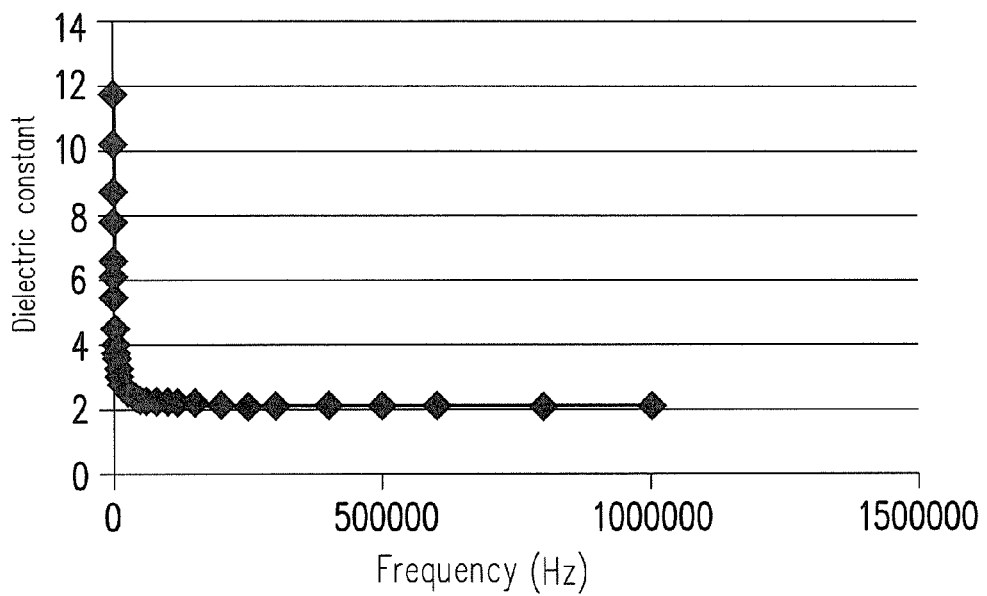
FIG. 11A is a relationship diagram between the dielectric constant and the frequency of a zeolite composite film.

FIG. 11A is a relationship diagram between the dielectric constant and the frequency of the zeolite composite film. Referring to FIG. 11A, the dielectric constant of the zeolite composite film is about 2.15, proving the dielectric constant of the zeolite composite film may be effectively maintained under 2.5 with the method of the invention. Therefore, the zeolite composite film fabricated satisfies the demand of the semiconductor industry toward low dielectric thin films.

Figure 11B:
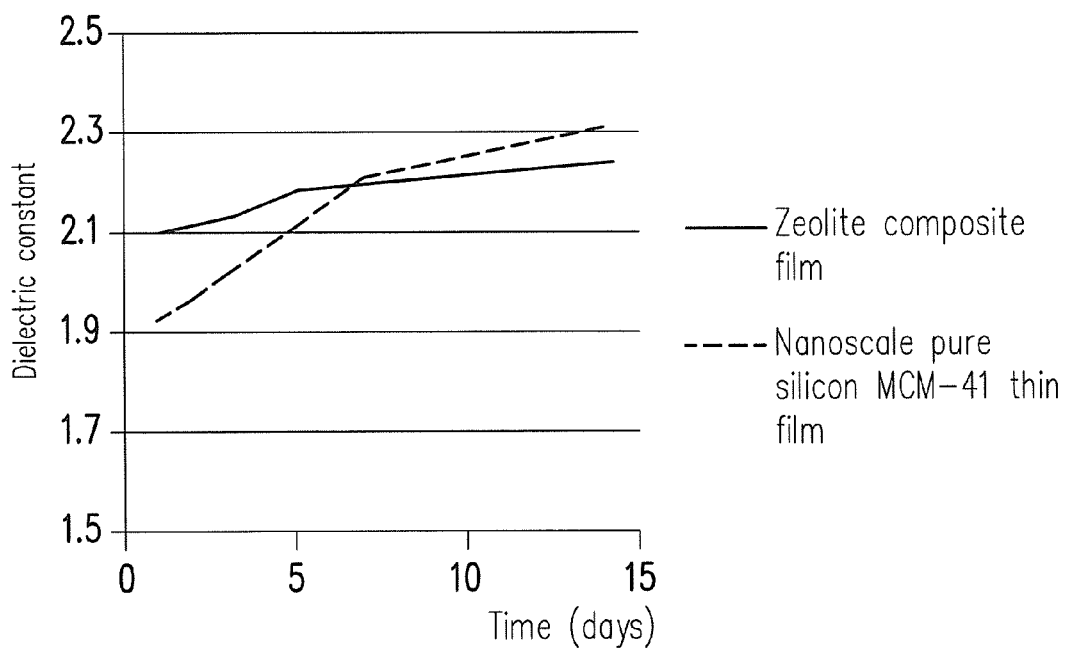
FIG. 11B is a relationship diagram between the dielectric constant and the time of a zeolite composite film and a nanoscale pure silicon MCM-41 thin film.

FIG. 11B is a relationship diagram between the dielectric constant and the time of the zeolite composite film and the nanoscale pure silicon MCM-41 thin film above. The solid line is the relationship between the dielectric constant and the time of the zeolite composite film, and the dashed line is the relationship between the dielectric constant and the time of the nanoscale pure silicon MCM-41 thin film. It is observed from FIG. 11B that the solid line is flatter than the dashed line, indicating less change in the dielectric constant with time for the zeolite composite film. That is, the zeolite composite film has a more stable dielectric constant.

4. Planarity:

In order to determine the roughness of the zeolite composite film fabricated with the present fabrication, in the present experimental example, an atomic force microscope (AFM) is used to observe the roughness of the zeolite composite film.

Figure 12A:
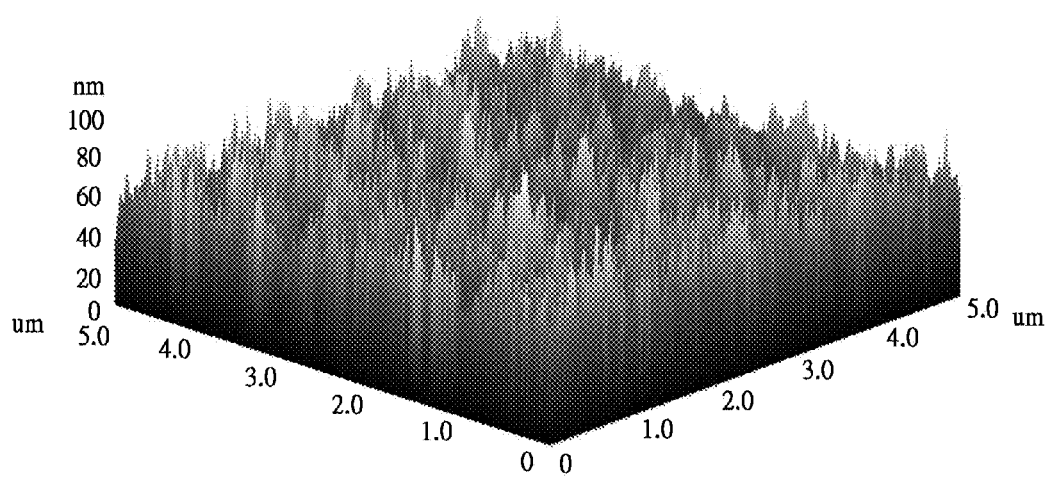
FIG. 12A is a surface roughness diagram of a zeolite composite film of the first experimental example of the invention.
Figure 12B:
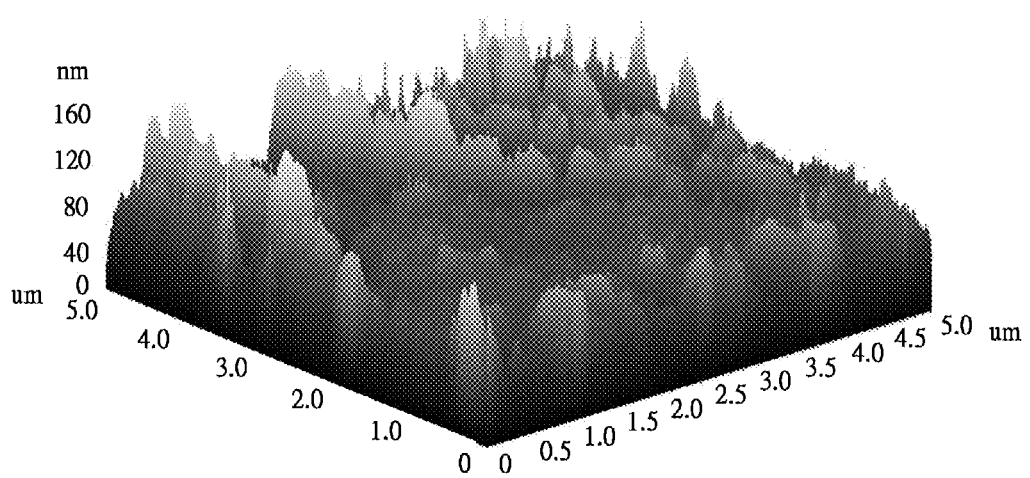
FIG. 12B is a surface roughness diagram of a nanoscale pure silicon MCM-41 thin film of the first experimental example of the invention.

FIG. 12A is a surface roughness diagram of the zeolite composite film of the first experimental example of the invention, wherein the surface roughness of the zeolite composite film is 6.6 nm. FIG. 12B is a surface roughness diagram of the nanoscale pure silicon MCM-41 thin film of the first experimental example of the invention, wherein the surface roughness of the nanoscale pure silicon MCM-41 thin film is 13.7 nm. It is known from comparing FIG. 12A and FIG. 12B that, the surface fluctuation of FIG. 12B is apparently greater, and the surface of FIG. 12A is more even. Moreover, the zeolite composite film has less surface roughness (6.6 nm), therefore the surface of the zeolite composite film obtained with the present fabrication has better quality.

Figure 13:
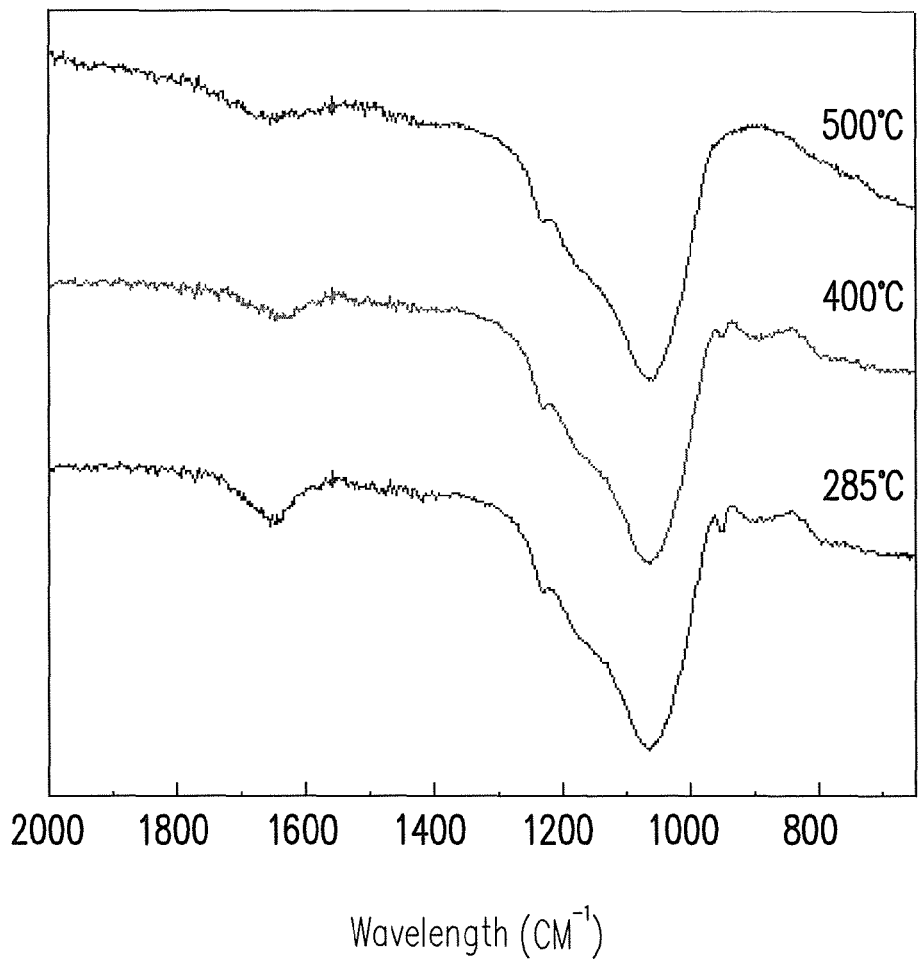
FIG. 13 is an IR spectra of the zeolite composite films at various temperatures.

5. Thermal Stability:

FT-IR is used to investigate the thermal stability of the zeolite composite film. FIG. 13 is an IR spectra of the zeolite composite films at various temperatures, wherein the zeolite composite films are respectively heated at 285° C., 400° C., and 500° C., respectively for 3 hours prior to the IR measurements. As shown in FIG. 13, the signal strength of the zeolite composite films remain relatively unchanged under the three temperatures at 285° C., 400° C., and 500° C. These results suggest that the zeolite composite films, which can endure a high temperature of 500° C., have desired thermal stability. According to the above analyses, the fabrication of a zeolite composite film by the present embodiment enhances the thermal stability effect.

Second Experimental Example

In the following, the detailed steps of the fabrication of the second experimental example are explained using the various components of FIG. 2B.

The present experimental example is similar to the first experimental example. However, the present experimental example and the first experimental example are different in that, in the step of fabricating the zeolite composite film in the present experimental example, the plasma generator 32 is used to conduct a plasma reaction to deposit the vaporized droplets formed from the mixture suspension 202 on the substrate 206.

Specifically, after the silicon chip 206 is heated to 350° C., in the present experimental example, an inert gas composed of argon and oxygen is used to bring the vaporized droplets formed from the mixture suspension into the plasma generator 32 to conduct a plasma reaction, wherein the flow rate of the inert gas is set to 10 L/min (slm) and the flow rate of the vaporized droplets is set to 100 cc/min by the flow controls 26 and 28. The voltage of the plasma generator 32 is set to 90 V, and the distance between the outlet of the plasma generator 32 and the substrate 206 is adjusted to 5 mm. Then, the plasma treated zeolite crystals, silicon colloids, and MCM-41 particles are deposited on the heated substrate 206 to remove the templating agents in the MCM-41 particles to obtain the zeolite composite film.

Similarly, the zeolite composite film fabricated with the present fabrication has greater surface tension, higher adhesion, and better planarity. Moreover, the zeolite composite film satisfies the demand of the semiconductor industry toward low dielectric thin films. Moreover, the zeolite composite film has a regular macroporous-mesoporous-microporous structure, wherein the pore sizes of the macroporous structures are between 2 μm and 3 μm, the pore sizes of the mesoporous structures are between 1.5 nm and 3 nm, and the pore sizes of the microporous structures are between 0.5 nm and 0.7 nm. In addition, the other fabrication steps of the present experimental example are similar to the fabrication steps of the first experimental example, and therefore are not repeated here.

Based on the above, in the present fabrication of the zeolite composite film, a suspension containing a plurality of zeolite crystals and a plurality of silicon colloids is mixed with a mesoporous particle suspension including a plurality of mesoporous particles according to a set ratio. Then, the mixture suspension formed by mixing is vaporized to form vaporized droplets, and the vaporized droplets are deposited on a heated substrate by adjusting the process parameters (for instance, the substrate temperature and the flow rate of the carrier gas). A zeolite composite film having better quality is thus fabricated. Moreover, the macroporous-mesoporous-microporous structure in the zeolite composite film may be confirmed by using instruments such as FT-IR, XRD, BET, TGA, SEM, and CA to detect the characteristics of the zeolite composite film and that the zeolite composite film fabricated has higher adhesion and reduced roughness, therefore satisfying the application requirements.

Although the invention has been described with reference to the above embodiments, it will be apparent to one of ordinary skill in the art that modifications and variations to the described embodiments may be made without departing from the spirit and scope of the invention. Accordingly, the scope of the invention will be defined by the attached claims not by the above detailed descriptions.

What is claimed is:

1. A fabrication of a zeolite composite film, comprising:
mixing a composition of water, aluminum isopropoxide, TMAOH, and TEOS according to a set ratio to form a first mixture, and hydrolyzing the first mixture by stirring in room temperature, then heating to obtain a second mixture;
taking an upper layer suspension obtained from a centrifugation of the second mixture, wherein the upper layer suspension comprises a plurality of zeolite crystals and a plurality of silicon colloids, and particle sizes of the zeolite crystals are less than 50 nm;
preparing a mesoporous particle suspension, wherein the mesoporous particle suspension comprises a plurality of mesoporous particles, and each mesoporous particle comprises a plurality of pores and a plurality of templating agents inside the pores;
applying a heat treatment to a substrate;
mixing the upper layer suspension and the mesoporous particle suspension to form a mixture suspension, and vaporizing the mixture suspension to form a plurality of vaporized droplets; and depositing the vaporized droplets on the heated substrate to remove the templating agents in the mesoporous particles and to form a zeolite composite film, wherein the zeolite composite film comprises a plurality of macroporous, mesoporous and microporous structures.

2. The method of claim 1, wherein the set ratio of the first mixture is expressed by a mole ratio 0.15 $Na_2O$:5.5 $(TMA)_2O$:2.3 $Al_2O_3$:10$SiO_2$:570 $H_2O$.

3. The method of claim 1, wherein a temperature of the heat treatment applied to the substrate is between 250° C. and 400° C.

4. The method of claim 1, further comprising performing a pretreatment to the substrate before applying the heat treatment to the substrate.

5. The method of claim 1, wherein the step of vaporizing the mixture suspension comprises using a dispersant to vaporize the mixture suspension.

6. The method of claim 1, wherein the step of depositing the vaporized droplets on the substrate comprises using an air as a carrier gas to deposit the vaporized droplets on the substrate.

7. The method of claim 1, wherein the step of depositing the vaporized droplets on the substrate comprises:

using an inert gas to bring the vaporized droplets into a plasma to conduct a plasma reaction in order to obtain a plurality of plasma treated zeolite crystals, silicon colloids, and mesoporous particles; and depositing the plasma treated zeolite crystals, silicon colloids, and mesoporous particles on the substrate.

8. The method of claim 7, wherein the inert gas is argon, and the flow rate of the argon is 60 cc to 200 cc per minute.

9. The method of claim 7, wherein the plasma is generated by applying a voltage of 60 V to 90 V.

10. The method of claim 1, wherein pore sizes of the macroporous structures are between 2 μm and 3 μm.

11. The method of claim 1, wherein pore sizes of the mesoporous structures are between 1.5 nm and 3 nm.

12. The method of claim 1, wherein pore sizes of the microporous structures are between 0.5 nm and 0.7 nm.

13. The method of claim 1, wherein a dielectric constant of the zeolite composite film is less than 2.3.

14. The method of claim 1, wherein the set volume ratio of the mesoporous particle suspension to the upper layer suspension is 3.8:1 in the mixture suspension.

* * * * *